US 7,256,835 B2

(12) United States Patent
Jiang et al.

(10) Patent No.: US 7,256,835 B2
(45) Date of Patent: Aug. 14, 2007

(54) APPARATUS AND METHOD FOR DEINTERLACING VIDEO IMAGES

(75) Inventors: Hong Jiang, Warren, NJ (US); Kim M. Matthews, Watchung, NJ (US); Lesley Jen-Yuan Wu, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 453 days.

(21) Appl. No.: 10/860,942

(22) Filed: Jun. 4, 2004

(65) Prior Publication Data

US 2005/0270415 A1    Dec. 8, 2005

(51) Int. Cl.
*H04N 7/01* (2006.01)

(52) U.S. Cl. ...................... 348/448; 348/452

(58) Field of Classification Search ........ 348/448–452, 348/458, 459, 441, 97, 98
See application file for complete search history.

(56) References Cited

U.S. PATENT DOCUMENTS 5,689,301 A * 11/1997 Christopher et al. .......... 348/97
6,700,622 B2 * 3/2004 Adams et al. .............. 348/448

* cited by examiner

*Primary Examiner*—Michael H. Lee (57) ABSTRACT

An apparatus and method for deinterlacing video images is described. In one exemplary implementation, the apparatus receives a video stream in an interlaced format. The apparatus includes a processing system configured to determine whether or not the video stream originated from a progressive format. Based on that determination, the processing system selects one of two modes of operation to deinterlace the video stream: an interpolation mode of operation or a non-interpolation mode of operation.

13 Claims, 8 Drawing Sheets

APPARATUS AND METHOD FOR DEINTERLACING VIDEO IMAGES

CROSS-REFERENCE TO RELATED APPLICATIONS

This application is related to a co-pending U.S. Non-provisional patent application entitled *Method and Apparatus for De-Interlacing Video Images* identified by Ser. No. 2002/0027610A1, filed Jan. 16, 2001, which is hereby incorporated by reference in its entirety.

TECHNICAL FIELD

The present invention relates generally to processing video images, and more particularly, to deinterlacing interlaced video images.

BACKGROUND

Video image streams are often recorded, transmitted, and displayed in two different video image formats: an interlaced format (also commonly referred to as the interlaced scan format) and a progressive format (also commonly referred to as the progressive scan format).

In the interlaced format, each video frame, which is a raster array of pixels representing an image, includes an odd field and an even field. The odd field includes pixels located on odd-numbered horizontal scan lines of the frame and the even field includes pixels located on the even numbered horizontal scan lines of the frame. Thus, each field contains approximately half the information content, i.e., pixels, of the complete video frame. When displayed on an interlaced-based display device, such as a conventional television, video images are presented in the form of a rapid sequence of fields, in which odd fields and even fields are displayed consecutively, e.g. a rate of 60 fields per second, for purposes of reconstructing an entire image at 30 frames per second (although various other rates may apply). Even though only half of the image is displayed per field, the rapid sequence of alternating odd and even horizontal scan lines creates the illusion of a full video image.

In the progressive format, a video image is represented entirely in a single frame that includes pixels on all horizontal lines of the full image. When displayed on a progressive-based display device, such as a computer monitor or of High Definition Television (HDTV), video images are presented in the form of progressively scanned frames, e.g., at a rate of 60 frames per second (although various other rates may apply).

Most conventional televisions support only the interlaced format and cannot perform progressive scanning. Accordingly, most video applications associated with display on televisions, including digital video players, such as DVD players, etc., are currently formatted in the interlaced format. As more progressive scan devices are adapted to play video on computers and HDTVs, however, there is a need for such devices to convert video from the interlaced format to progressive format.

The process of converting a video from the interlaced format to the progressive format is generally referred to as deinterlacing (also referred to as line-doubling). There are several ways to perform deinterlacing. Inexpensive devices may use what is known in the industry as the "weave" technique for performing the conversion from the interlaced format to the progressive format. Weaving simply merges even and odd fields together to make one progressive frame.

If the video image is still (i.e., there is little or no motion within the images or, at least the motion is slow), weaving tends to produce an image that is visually precise. However, if an image contains many and/or quickly moving objects, the image produced on the display devise tends to contain visual artifacts, such as visual distortions, feathering around the periphery of a moving object, flickering, pixel discontinuities, image inconsistencies, varying vertical resolutions, and other visual distortions. These artifacts tend to make images unsuitable for viewing on a HDTV or other high quality video players. These visual distortions are caused because there may be a time difference between each odd and even field, and when they are combined, the time differences produce the artifacts.

Another technique used to convert video from interlaced format to the progressive format is known as interpolation (also referred to as the "Bob" technique). Interpolation involves converting each independent field into a single frame rather than combining two fields (i.e., the even and odd fields corresponding to a single frame) to form a frame. But each field in the interlaced format only contains half the even or odd lines of a full resolution picture in the progressive format. To create a full frame, interpolation techniques involve filling-in missing lines, meaning the even or odd lines not a part of the particular field that is being converted. For instance, if there is an even field, interpolation techniques will fill-in the so-called "missing lines," meaning the even or odd lines that are not a part of the current field. For instance, if there is an even field, interpolation techniques will fill-in the missing lines, i.e., the odd lines, based on the pixel data from the existing, even lines to predict suitable pixel values for the pixels in the lines that are being interpolated, i.e., the missing pixels in the missing lines, and create a progressive frame. Correspondingly, if there is an odd field, the interpolation techniques will fill-in the missing lines, i.e., the even lines, based on the existing odd lines to create a progressive frame. More particularly, Interpolation techniques will fill-in the even or odd missing lines (depending on the field) by using pixels above and below those missing lines that are to be approximated through mathematical estimations. Unfortunately, these mathematical estimations are educated guesses that often produce artifacts, usually associated with motion and shifts of information in fields. In the world of HDTV these artifacts are often sufficiently visually noticeable to noticeably decrease the quality of the image.

There are other techniques that borrow from weaving and interpolation techniques, including combing the two using motion detection. Most, if not all these techniques utilize expensive equipment and tend to produce images that have visual artifacts that are noticeable to users. Thus, prior art techniques for minimizing visual artifacts when converting a video stream from an interlaced format to progressive format have been unable to completely eliminate the visual artifacts caused by deinterlacing.

SUMMARY

The principles of the invention overcome the prior art problems of introducing visual artifacts into a resulting progressive version of a video stream when deinterlacing from an interlaced format by determining whether the video stream was originally formed from a video stream that was originally created in a progressive format. If the video stream originated from a progressive format, the video stream is simply reconstructed in the progressive format from the interlaced format, by the afore described weaving technique, i.e., combining corresponding even and odd fields which form a progressive frame of the video stream. This generally will not create artifacts because there is no time differential between the two (odd and even) interlaced fields since they were originally a single progressive frame and because interpolation is not performed to fill in missing lines.

It is noted that it may be necessary to compensate for differences in frame rates when converting from the interlaced format to progressive format using the aforementioned non-interpolation-based technique. This may involve duplicating particular frames (e.g., every other frame, every third frame, etc.), adjusting the video stream input speed, as well as performing other related techniques to compensate for the frame rate differences, which are beyond the scope this discussion, but are well within the technical purview of those skilled in the art.

In one exemplary implementation, an apparatus receives a video stream in an interlaced format. The apparatus includes a processing system configured to determine whether or not the video stream originated from a progressive format. Based on that determination, the processing system selects one of two modes of operation to convert the video stream from an interlaced format to a progressive format: an interpolation mode or a non-interpolation mode.

More specifically, the processing system selects the non-interpolation mode of operation, if the video stream originated from the progressive format. According to the non-interpolation mode of operation, the processing system reconstructs the video stream in the progressive format from the interlaced format in lieu of interpolating the missing lines, by combining (i.e., weaving) corresponding even and odd lines of a field to reform a respective frame of the video stream in the progressive format.

The processing system selects the interpolation mode of operation, if the video stream did not originate from the progressive format. According to the interpolation mode of operation, the processing system converts the video stream from the interlaced format to a progressive format by interpolating to derive the pixels in the missing lines from fields of the video stream in the interlaced format.

In one exemplary embodiment of the invention, the technique used for determining whether a video stream originated from a progressive format or not involves identifying a missing line in a particular field of a video stream. More than one missing line may be identified. Next, an average value $E_M$ of a particular pixel located on the missing line is the calculated. This may be accomplished by taking the average value between a corresponding pixel above and a corresponding pixel below the particular pixel located on the missing line. Alternatively, an average value of more than one pixel, such as one or more groups of pixels located on the missing line can be determined by computing the average values of one or more pixels above and below the missing line. The particular pixels selected to compute the average value of a missing pixel are preferably selected from a portion of a field where motion is detected. This may be accomplished by weighting pixels that are moving, and/or eliminating those pixels in an image, which are considered to be motionless from being considered in the calculations.

Next, a difference ($Diff_0$) between the average value of the particular pixel on the missing line and an actual pixel value E for a correspondingly positioned pixel located on a non-missing line from a previous field is calculated. $Diff_0$ may be recorded in a memory device.

These operations performed are repeated for a predetermined plurality of consecutive fields. For example, a missing line in the next consecutive field of the video stream is identified. An average value $E_M$ of a particular pixel located on the missing line is calculated. This may be accomplished by taking the average value between a corresponding pixel above and a corresponding pixel below the particular pixel. A difference ($Diff_1$) between the average value $E_{M1}$ of the pixel on the missing line and an actual pixel value for a correspondingly positioned pixel located on a non-missing line from a previous field is calculated. $Diff_1$ is recorded in a memory device. This process of calculating difference values is performed for a plurality of pixels over a span of consecutive fields, e.g., ten fields.

Next, a determination is made whether each consecutive pixel value alternates repetitively from a high value to a low value, then to a high value, then to a low value, and so forth, for a plurality of consecutive fields. A pattern with difference values that repetitively alternate between high and low values for a plurality of consecutive fields is indicative of an interlaced video stream that was originally formed from a video stream in a progressive format. If the pattern had sequential difference values that were close together or not alternating from a low value, to a high value, to a low value, to a high value . . . and so forth, then the pattern would most likely indicate that the video stream did not originate from a progressive format. In other words, the pattern may include values that are too close together or that do not resemble a pattern in which the difference values alternate from a low value to a high value, to a low value, and so forth.

Accordingly, if the difference values alternate repetitively between a high value and a low value for the plurality of consecutive fields then a conclusion can be made that the video stream originated from a progressive format. On the other hand, if the difference values do not alternate repetitively between a high value and a low value for the plurality of consecutive fields, then a conclusion is made that the video stream did not originate from a progressive format.

The interpolation mode of operation or the non-interpolation mode is selected as describe above, based on the conclusion that the video stream originated from the progressive format or not.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Figure 1:
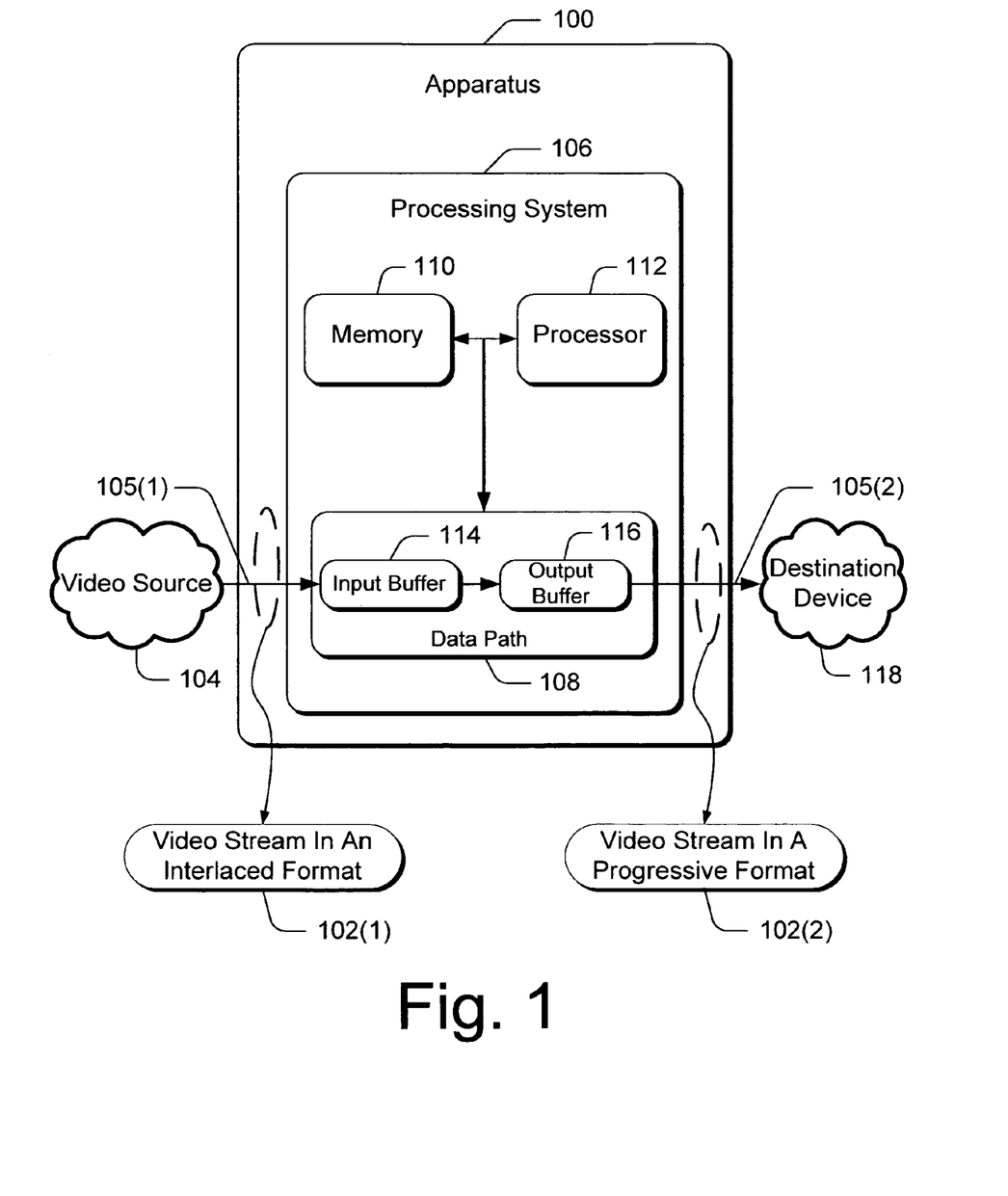
FIG. 1 illustrates various components of an exemplary apparatus suitable for deinterlacing an interlaced video stream.

FIG. 1 illustrates various components of an exemplary apparatus 100 suitable for deinterlacing an interlaced video stream. Apparatus 100 may be any type of device capable of deinterlacing video images, such as a video digital processing system, a deinterlacer, a general purpose computer, a set-top box, a camcorder, a digital video recorder (DVR) and playback system, a personal video recorder (PVR) and playback system, and any other type of client device that may be implemented in a television-based entertainment system, a gaming system, a multimedia system, the combination of any of the above example devices, and other smart devices capable of deinterlacing a video stream.

Apparatus 100 typically receives a video stream 102(1) from a video source 104 via communication link 105(1). Video stream 102(1) includes video images formatted in an interlaced format. Apparatus 100 converts video stream 102(1) from an interlaced format into a progressive format. That is, output video stream 102(2) includes video images formatted in a progressive format. Once converted to progressive format, video stream 102(2) may be transmitted to a destination device 118 via communication link 105(2).

Video source 104 represents any type of local or remote component(s), such as memory, that may or may not be integrated (e.g., reside) as part of apparatus 100. Video source 104 may also represent any type of broadcast center(s) in which video stream 102(1) is transmitted to apparatus 100 via communication link 105(1).

Destination device 118 represents any type of local or remote component(s) capable of receiving video stream 102(2), such as a display device, monitor, memory device, a broadcast transmission device, etc. Destination device 118 may be integrated within apparatus 100.

Communication links, referred to generally as reference number 105, represent various transmission media such as a bus, optical fiber, a conventional telephone line, a DSL connection, a cable, and/or transmission media, such as satellite transmission, radio frequency transmission, and/or via any other known transmission media.

Apparatus 100 includes a processing system 106 configured to deinterlace video stream 102(1) from an interlaced format to a progressive format. In one implementation, processing system 106 includes a data path 108, memory 110, and a processor 112. Processing system 106 may include one or more of any of the aforementioned elements.

Data path 108 handles the flow of data from the time the video stream, referred to generally as reference number 102, is received from video source 104 until it is converted to a progressive format and is ready for display. Data path 108 includes an input buffer 114 and an output buffer 116. Input buffer 114 and output buffer 116 represent any type of non-volatile or volatile memory device capable of temporarily storing video images in the form of video stream 102. For instance, input buffer 114 and output buffer 116 can be implemented as one or more registers, latches, buffers, or queues. Input buffer 114 is generally used to synchronize the flow of data from video source 104 to processing system 106. Output buffer 116 is generally used to synchronize the flow of data transmitted from processing system 106 to destination device 118 via communication link 105(2).

Although not shown, data path 108 may also include other memory devices that may be used by processing system 106 to store and manipulate data. Additionally, although input buffer 114 and output buffer 116 are illustrated as being external to processor 112, they may also reside within processor 112. Furthermore, input buffer 114 and output buffer 116 may be arranged in various configurations that may include several data storage components.

Processor 112 processes various instructions or programmable logic from memory 110 to control the operation of processing system 106 and to communicate with other electronic, mechanical, and computing devices. Functionality of processor 112 may be achieved through hardware-based components, programmable logic, or processor-executable instructions in the form of hard-coded logic and/or soft-coded instructions stored in memory 110. Generally, processor-executable instructions include instructions, routines, programs, objects, components, data structures, logic, circuits, state-machines, firmware, software, and the like that perform particular functions or implement particular abstract data types.

Processor 112 represents a broad range of general purpose or special purpose processor configurations, including, but not limited to: a self-executing special-purpose programmable logic array in the form of a FPGA (Field Programmable Gate Array); one or more ASICs (Application Specific Integrated Circuit); a state-machine; a DSP (Digital Signal Processor); microprocessor; or other processor-based technology including hybrid circuit and programmable logic technologies.

Memory 110 represents a data or logic storage media in the form of non-volatile memory and/or volatile memory, examples of which include, but are not limited to: flash memory; CD-ROM, DVD (digital versatile disks); other optical storage; RAM (random access memories); ROM (read only memories); EEPROM (electrically erasable programmable read-only memory) and the like; programmable logic; FPGAs; etc. In one implementation, memory 110 may store various information, instructions and/or data to enable processor 112 to deinterlace an interlaced video stream.

Although memory 110 is illustrated as residing outside processor 112, one or more portions of memory 110 may be part of processor 112. Additionally, one or more portions of memory 110 may be part of data path 108.

Figure 2:
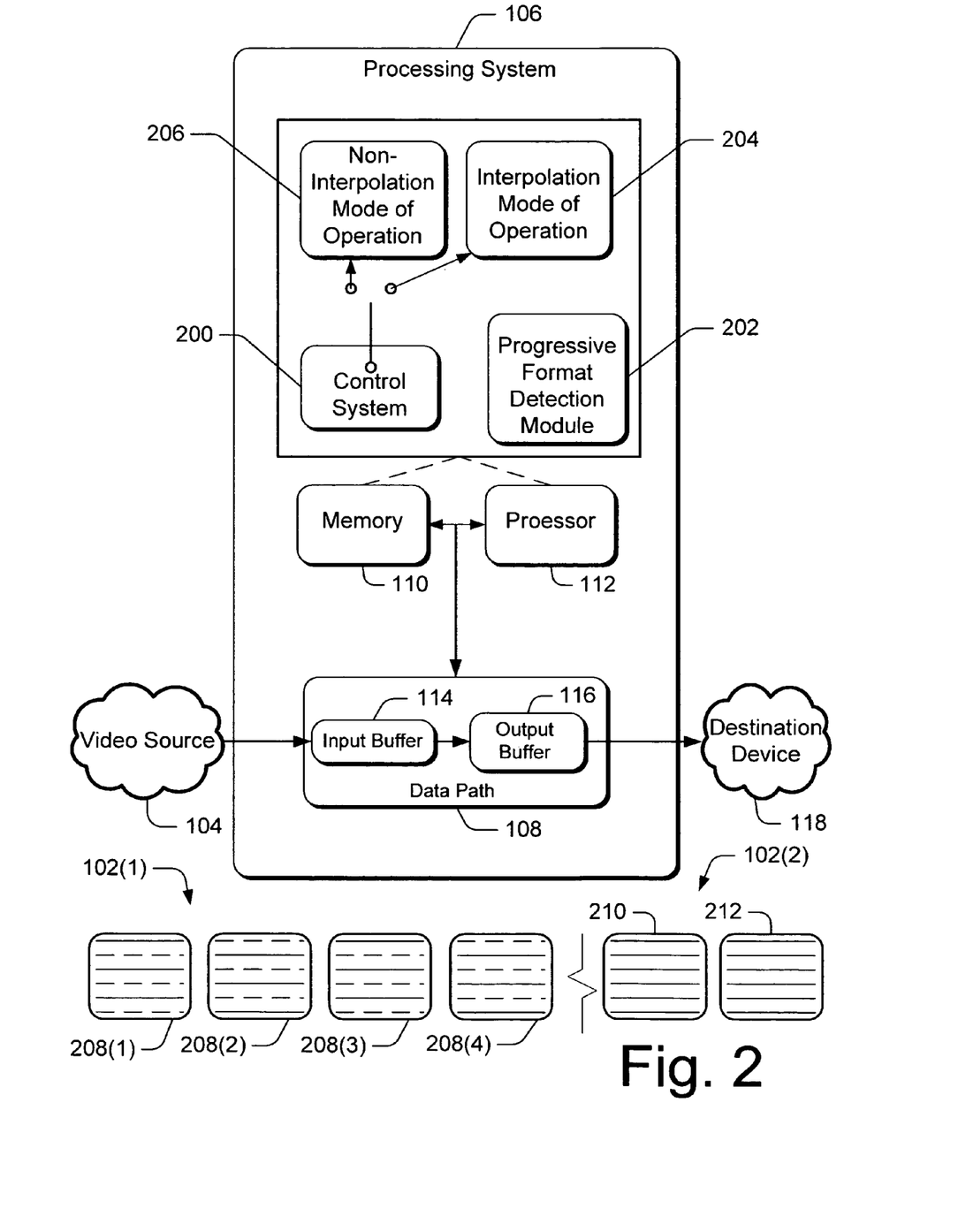
FIG. 2 illustrates a block diagram of a processing system that includes a control system and a progressive format detection module.

FIG. 2 illustrates a block diagram of processing system 106 that includes a control system 200 and a progressive format detection module 202. Control system 200 controls the operation of processing system 106. Progressive format detection module 202 operates in conjunction with control system 200 to enable processing system 106 to determine whether video stream 102(1) received by input buffer 114 originated from a progressive format or not. In other words, progressive format detection module 202 determines whether a video stream received in an interlaced format was originally formed from video stream in a progressive format.

There are many scenarios in which a video stream may be converted from progressive format, to an interlaced format, and then back to a progressive format. For example, suppose a video sequence was originally recorded in a progressive format and then converted into an interlaced format for broadcasting and display on standard television sets that can display only interlaced video images. If this broadcast is received by a newer television set that uses progressive scan technology, such as a high-definition-television set (HDTV set), the HDTV set has to re-convert the video sequence from the interlaced format to the progressive format in order to display the video sequence. Progressive format detection module 202, operating on the HDTV is configured to analyze the video sequence and determine whether it was originally formatted in a progressive format. The aforementioned example, illustrates one of many other scenarios in which a video stream may be converted from progressive format, to an interlaced format, and then back to a progressive format. Techniques for determining whether the original source of an interlaced video stream was a progressive scan image stream are discussed below.

Control system 200 and/or progressive format detection module 202 may reside in processor 112 in the form of programmable logic, firmware, hardware-derived circuitry, etc. Alternatively, one or more portions of control system 200 and/or progressive format detection module 202 may reside in memory 110, in the form of processor-executable instructions accessible by processor 112. It is noted that processor-executable instructions may also reside within processor 112 in soft-coded instructions or the aforementioned programmable logic, firmware, etc.

As used herein, "processor-executable instructions" embody instructions, logic, data structures, program modules, or data that is accessible and readable by a processor 112. Processor-executable instructions may be stored on or transmitted across some form of processor-readable media. "Processor-readable media" can be any available media that can be accessed by a processor. Processor readable media includes volatile and non-volatile, removable and non-removable media implemented in any method or technology for storage of information such as processor readable instructions, logic, data structures, program modules, other data, etc.

Based on the determination made by progressive format detection module 202, control system 200 selects a mode of operation for deinterlacing an interlaced video stream. For example, in one implementation, control system 200 selects one of two modes of operation to deinterlace the video stream based the determination made by progressive mode detection module 202, namely, an interpolation mode of operation 204 or a non-interpolation mode of operation 206.

Control system 200 selects the interpolation mode of operation 204, if progressive format detection module 202 determines that video stream 102 received by input buffer 114 did not originate from the progressive format. Control system 200 selects non-interpolation mode of operation 206, if progressive format detection module 202 determines that video stream 102 received by input buffer 114 originated from the progressive format.

When interpolation mode of operation 204 is selected, processing system 206 converts video stream 102(1) from the interlaced format to a video stream 102(2) in a progressive format. This may be accomplished by any suitable technique used by those skilled in the art to deinterlace an interlaced video stream through interpolation or other formulaic approximations. In most instances, this is generally accomplished by using some type of formulaic approximation to derive values for pixels in the missing lines (shown as a dashed lines) in the fields 208(1), 208(2), 208(3), 208(4), which are extrapolated from pixel values in existing lines (illustrated as a solid lines) of fields 208(1), 208(2), 208(3), 208(4).

When non-interpolation mode of operation 206 is selected, processing system 106 reconstructs the video stream in the progressive format from the interlaced format in lieu of interpolating the missing lines, by combining consecutive pairs of corresponding fields (i.e., 208(1) with 208(2), 208(3) with 208(4), etc.) of video stream 102(1) in the interlaced format to form frames 210, 212 of the video stream 102(2) in the progressive format. In other words, alternate lines from each consecutive and corresponding field (208(1) with 208(2), 208(3) with 208(4))) are combined to result in frames 210 and 212 of the video stream 102(2) in the progressive format. In most instances, the non-interpolation mode of operation 206 reconstructs video stream 102(2) in the progressive format from the interlaced format, by combining consecutive pairs of corresponding fields (i.e., 208(1) with 208(2), 208(3) with 208(4), etc.) in the interlaced format to form frames 210, 212 of the video stream 102(2) in the progressive format.

Figure 3:
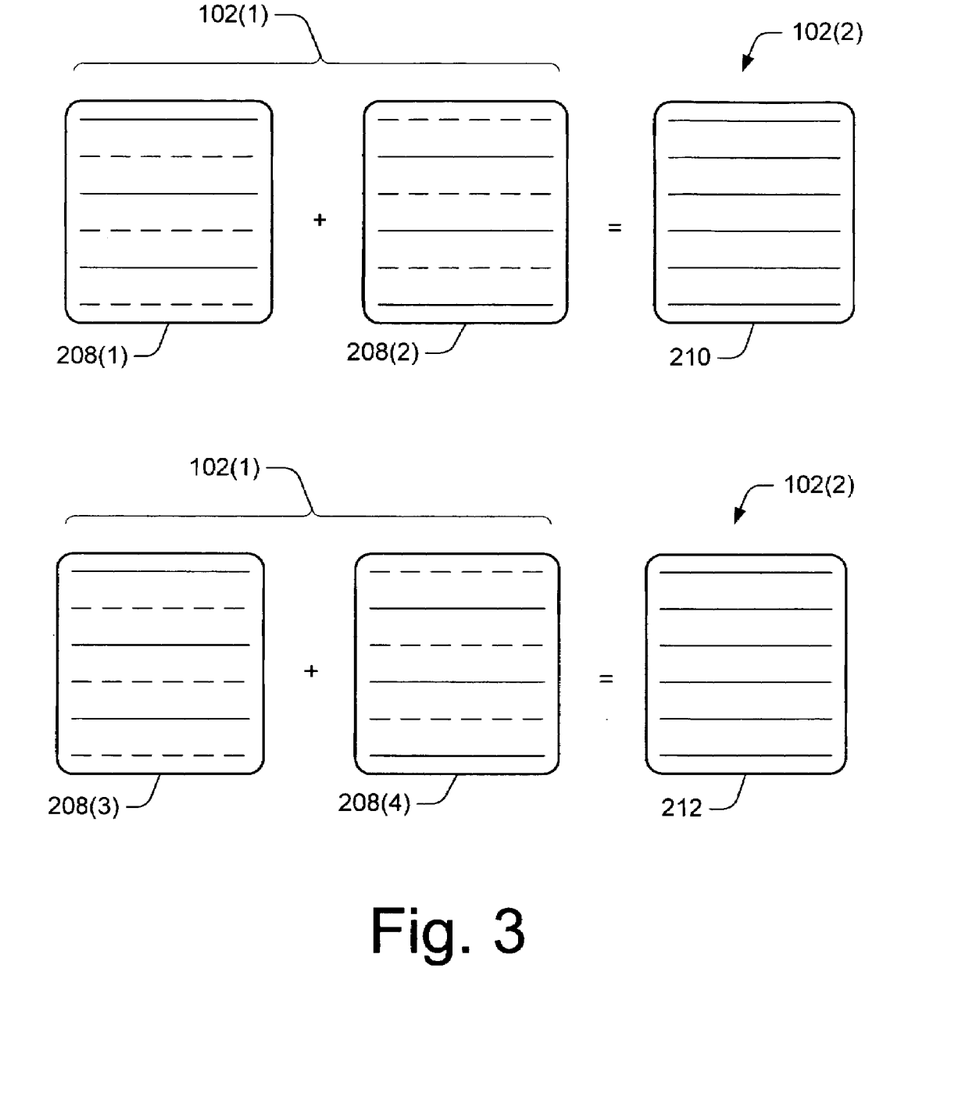
FIG. 3 shows how a frame of an interlaced video stream may be reconstructed by combining two consecutive and corresponding fields of a video stream in an interlaced format.

For instance, FIG. 3 shows how a frame of an interlaced video stream may be reconstructed by combining two consecutive and corresponding fields of a video stream in an interlaced format. In particular, FIG. 3 shows that combining field 208(1) with corresponding and consecutive field 208(2), reconstructs frame 210 of video stream 102 in a progressive format. FIG. 3 also shows that combining field 208(3) with corresponding and consecutive field 208(4) reconstructs frame 212 of video stream 102(2) in a progressive format.

Accordingly, the use of formulaic approximation associated with interpolation can be eliminated, if desired. It is possible to reconstruct a video stream in its original form (in the progressive format) from the interlaced format without performing artificial deinterlacing methods involving interpolation and without introducing artifacts into the video stream associated with performing the artificial deinterlacing methods.

Referring back to FIG. 2, once video stream 102(1) is deinterlaced by either of the selectable modes of operation described above (e.g., 204, 206), video stream 102(2) is transferred to output buffer 116 and temporarily stored until processing system 106 is permitted to synchronize transmission of the data from processing system 106 to a destination device 118.

While only the interpolation mode of operation 204 and the non-interpolation mode of operation 206 are mentioned above, it is possible that the processing system may use other modes of operation to deinterlace video stream 102, such as deinterlacing methods associated with the film mode of operation or other possible modes of operation.

Methods for processing system 106 may be described in the general context of processor-executable instructions. The described methods may also be practiced in distributed computing environments where functions are performed by remote processing devices that are linked through a communications network. In a distributed computing environment, processor-executable instructions may be located in both local and remote storage media, including memory storage devices.

Figure 4:
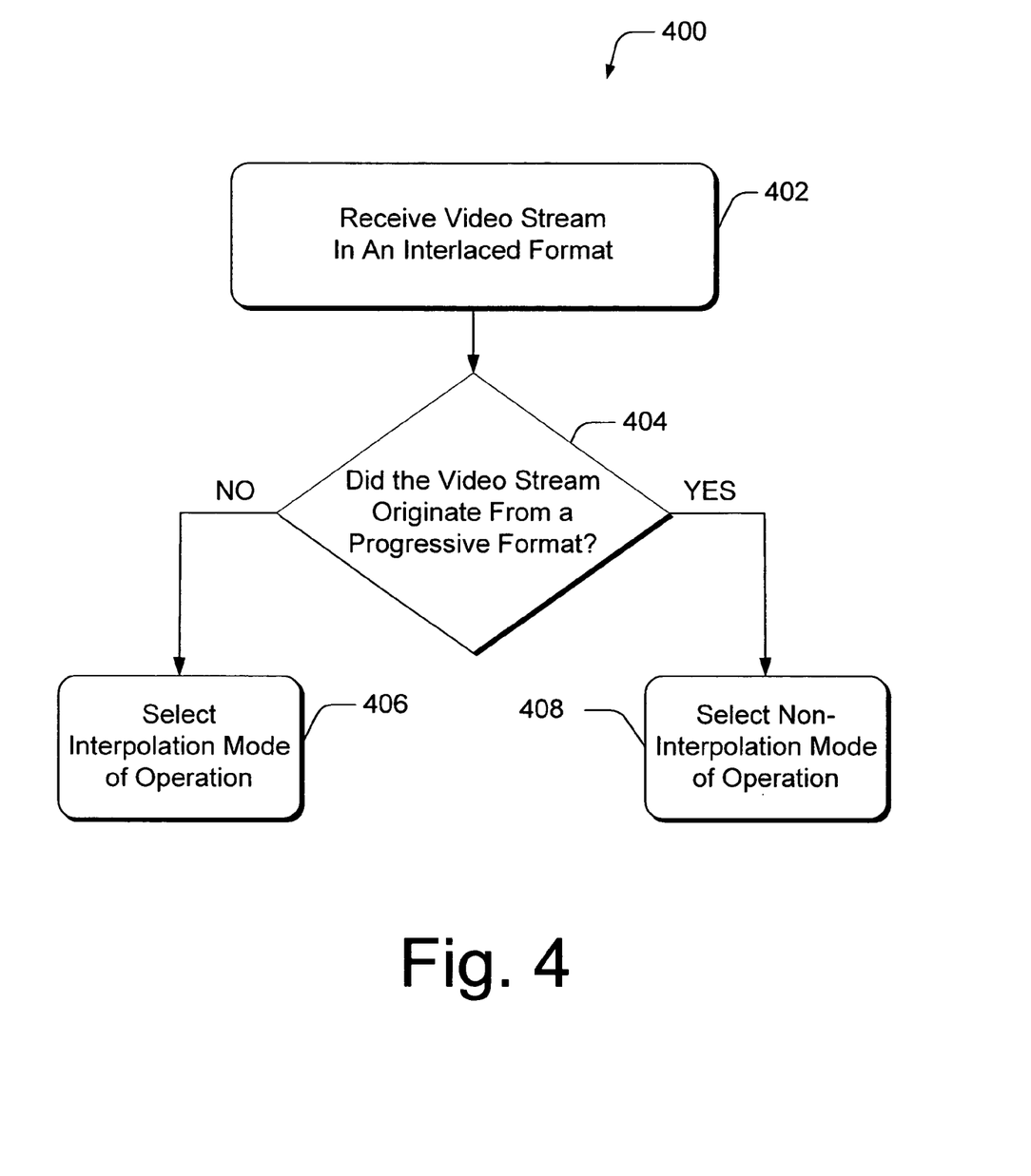
FIG. 4 illustrates a method used to implement a processing system configured to deinterlace an interlaced video stream according to either a selectable one of an interpolation mode of operation or a non-interpolation mode of operation.

FIG. 4 illustrates a method 400 used to implement a processing system configured to deinterlace an interlaced video stream according to a selectable one of an interpolation mode of operation or a non-interpolation mode of operation. Method 400 includes blocks 402, 404, 406, and 408. The order in which the method is described is not intended to be construed as a limitation, and any number of the described method blocks can be combined in any order to implement the method. Furthermore, the method can be implemented in any suitable hardware, software, firmware, or combination thereof.

In block 402, an apparatus receives a video stream in an interlaced format. For example, input buffer 114 (FIG. 1) receives video stream 102 (FIG. 1) in an interlaced format.

In decisional block 404, a determination is made whether the video stream originated from a progressive format. For example, progressive format detection module 202 (FIG. 2) is configured to analyze one or more portions of video stream 102 (FIG. 2) to determine whether or not it was originally formatted in a progressive format. An exemplary method used for determining whether a video stream was originally formed from a progressive format or not is described below with reference FIG. 5.

Referring to FIG. 4, if according to the "NO" branch of decisional block 404, the video stream did not originate from a progressive format, then, according to block 406, an interpolation mode of operation is used to convert the video stream from the interlaced format to a progressive format. This is accomplished by interpolating missing lines from fields of the video stream in the interlaced format.

For example, control system 200 (FIG. 2) selects interpolation mode of operation 204 (FIG. 2), if progressive format detection module 202 (FIG. 2) determines that video stream 102(1) did not originate from the progressive format. Interpolation mode of operation 204 involves performing some type of artificial reconstruction of a frame that typically introduces artifacts into the video stream once converted into the progressive format.

On the other hand, if according to the "YES" branch of decisional block 404 (FIG. 4), the video stream did originate from a progressive format, then, according to block 408, a non-interpolation mode of operation is selected to convert the video stream from the interlaced format to a progressive format. The non-interpolation mode of operation involves reconstructing the video stream in the progressive format by combining consecutive pairs of corresponding fields from the video stream in the interlaced format to form frames of the video stream in the progressive format.

For example, control system 200 (FIG. 2) selects non-interpolation mode of operation 206 (FIG. 2), if progressive format detection module 202 (FIG. 2) determines that video stream 102(1) originated from the progressive format. Non-interpolation mode of operation 206 involves reconstructing video stream 102 in the progressive format from the interlaced format, by combining consecutive pairs of corresponding fields (e.g., FIG. 3).

Figure 5:
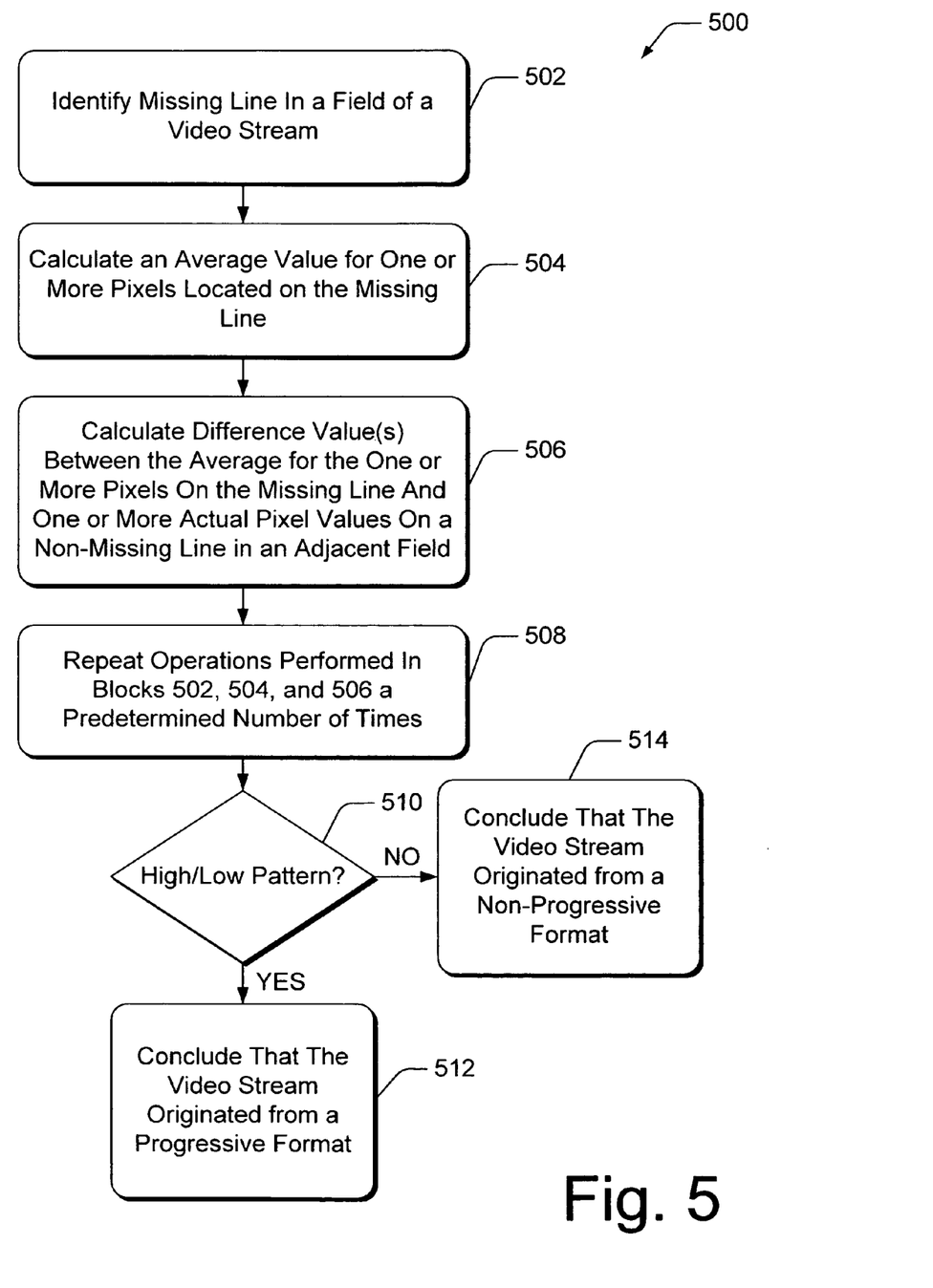
FIG. 5 illustrates a method for analyzing a video stream to determine whether the video stream originated from a progressive format or not.

FIG. 5 illustrates an exemplary method 500 for analyzing a video stream in an interlaced format to determine whether or not the video stream originated from a progressive format. That is, method 500 illustrates one exemplary way to analyze a video stream to determine whether or not the video stream originated from a progressive format. Methodological acts performed in method 500 correspond to decisional block 404 referred to in FIG. 4. Method 500 includes, blocks 502, 504, 506, 508, 510, 512, and 514. The order in which the method is described is not intended to be construed as a limitation, and any number of the described method blocks can be combined in any order to implement the method. Furthermore, the method can be implemented in any suitable hardware, software, firmware, or combination thereof.

Figure 6:
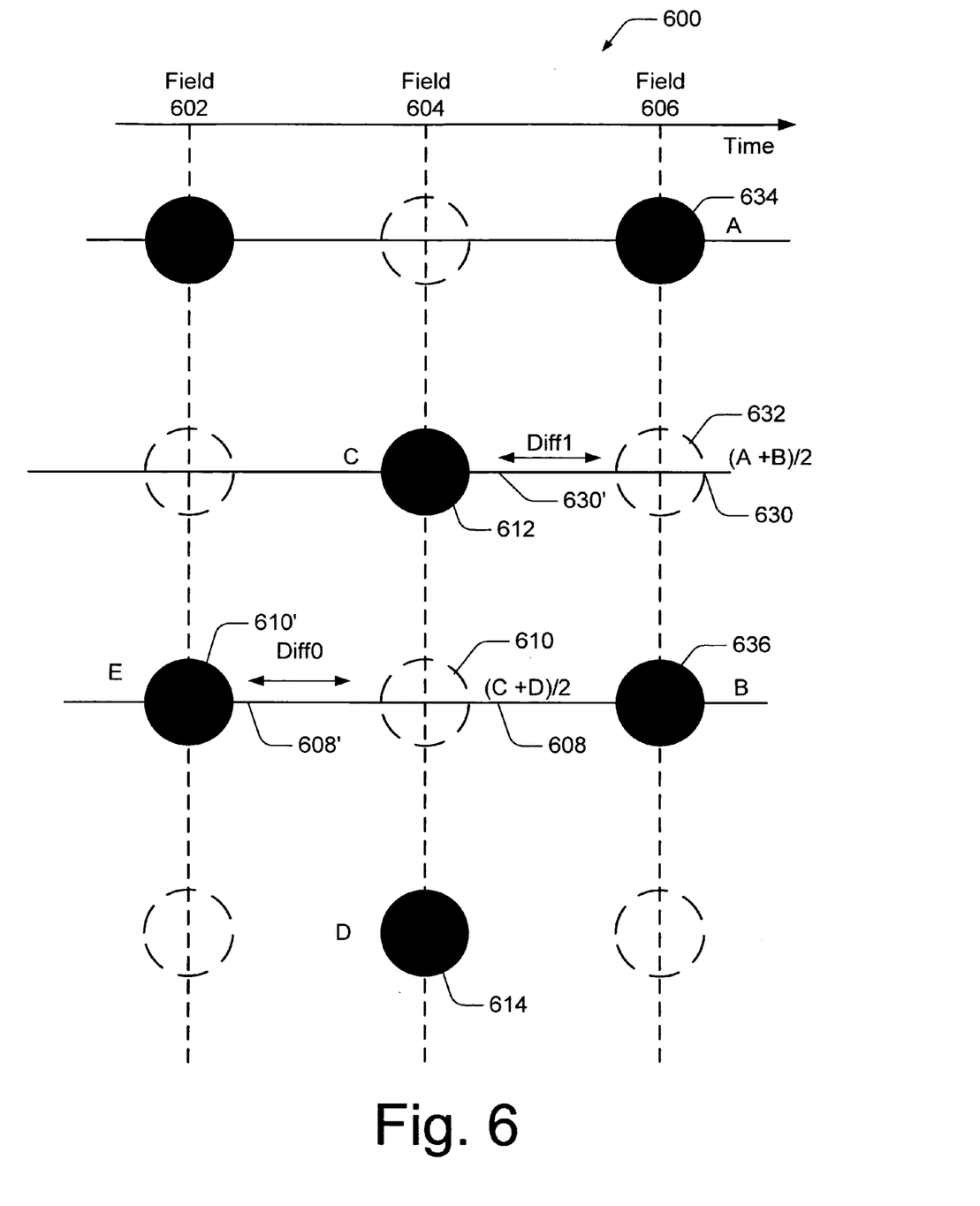
FIG. 6 shows several consecutive fields of a video stream in an interlaced format.

Exemplary method 500 (FIG. 5) shall also be described interchangeably with reference to FIG. 6, which shows several consecutive fields 602, 604, and 606, of a video stream 600.

Referring to FIGS. 5 and 6, in a block 502, a missing line in a particular field of a video stream is identified. For example a missing line 608 in field 604 is identified. More than one missing line may be identified.

In a block 504, an average value $E_M$ of a particular pixel 610 located on the missing line 608 is calculated. This may be accomplished by taking the average value between a corresponding pixel 612 above and a corresponding pixel 614 below pixel 610, e.g. $(C+D)/2=E_M$ where "M" stands for a missing pixel. Alternatively, an average value of more than one pixel, such as one or more groups of pixels located on the missing line can be determined by computing the average values of the one or more portions of pixels above and below the missing line. The particular pixels selected to compute the average value of a missing pixel are preferably selected from a portion of a field where motion is detected. This may be accomplished by weighting pixels that are moving, and/or eliminating those pixels in an image which are considered to be motionless from being considered in the calculations. For more details about how to determine motion of pixels in an image and other details about weighting motion of pixels when deinterlacing an interlaced video stream, please see U.S. Non-provisional patent application entitled *Method and Apparatus for De-Interlacing Video Images* identified by Ser. No. 2002/0027610A1, filed Jan. 16, 2001.

In block 506, a difference ($Diff_0$) between the average value $E_{M0}$ of the pixel 610 on the missing line 608 and an actual pixel value E for a correspondingly positioned pixel 610' located on a non-missing line 608' from a previous field 602 is calculated. $Diff_0$ may be recorded in a memory device, such as memory 110 (FIG. 1).

In block 508, operations performed in blocks 502, 504, and 506 are repeated for a predetermined plurality of consecutive fields. For example, a missing line 630 in the next consecutive field 606 of the video stream is identified. An average value $E_M$ of a particular pixel 632 located on the missing line 630 is calculated. This may be accomplished by taking the average value between a corresponding pixel 634 above and a corresponding pixel 636 below pixel 632, e.g., $(A+B)/2=E_{M1}$. A difference ($Diff_1$) between the average value $E_{M1}$ of the pixel 632 on the missing line 630 and an actual pixel value C for a correspondingly positioned pixel 612 located on a non-missing line 630' from previous field 604 is calculated. $Diff_1$ is recorded in a memory device, such as memory 110 (FIG. 1). This process of calculating difference values is performed for plurality of pixels over a span of consecutive fields. For instance, in one implementation, the process may be performed over a span of ten fields, although more or less fields may be selected for calculating the difference values.

Next, in a decisional block 510, a determination is made whether each consecutive pixel value alternates repetitively from a high value to a low value, then to a high value, then to a low value, and so forth, for a plurality of consecutive fields.

Figure 7:
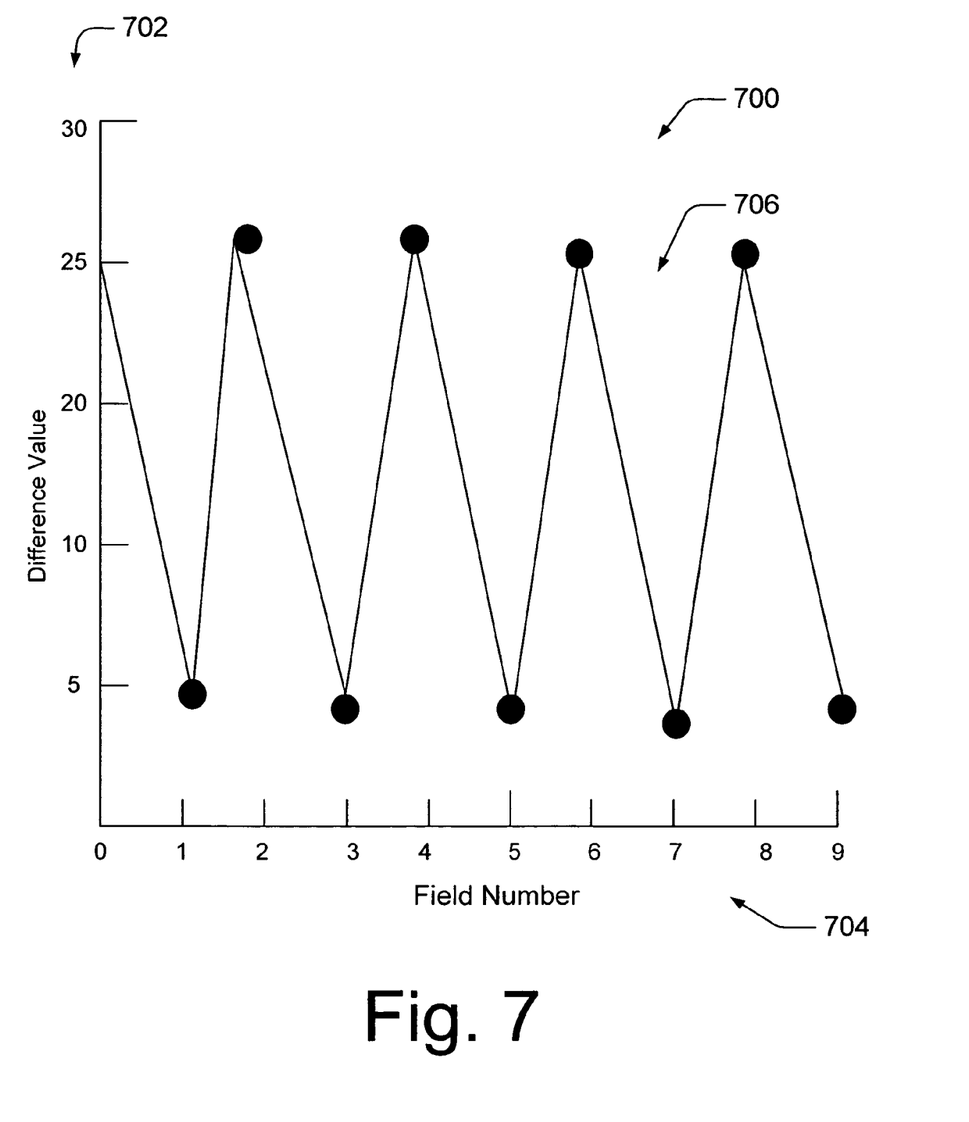
FIG. 7 illustrates a pattern used to determine whether an interlaced video stream originated from a video stream in a progressive format or not.

In the context of making the determination described in block 510, FIG. 7 illustrates a pattern used to determine whether or not an interlaced video stream originated from a video stream in a progressive format with respect to decisional block 510 (FIG. 5). In particular, FIG. 7 show a plot 700 with difference values indicated along the vertical axis 702 and consecutive field numbers indicated along the horizontal axis 704. A pattern 706 shows difference values repetitively alternating between high and low values for a plurality of consecutive fields (e.g., fields 0-9). Pattern 706 is indicative of an interlaced video stream that was originally formed from a video stream in a progressive format. If pattern 706 had sequential difference values that were close together or that did not alternative between high and low values for a plurality of consecutive fields, then the pattern would most likely indicate that the video stream did not originate from a progressive format.

Figure 8:
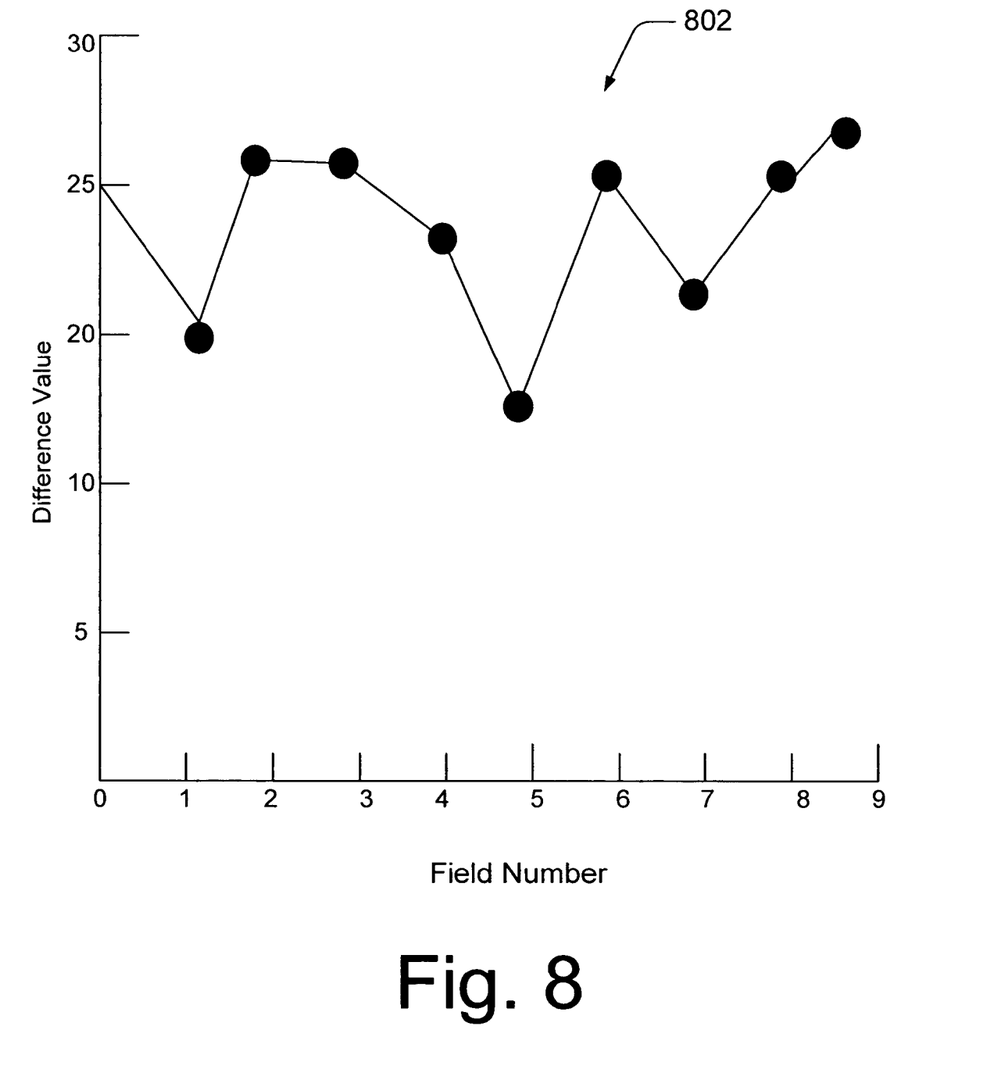
FIG. 8 illustrates an example pattern indicating the video stream did not originate from a progressive format.

In the context of making the determination described in block 510 (FIG. 5), FIG. 8 illustrates an exemplary pattern 802 that was generated in accordance with method 500, but having difference values that are too close together, indicating the video stream did not originate from a progressive format. In other words, the pattern 802 includes values that are too close together or that do not resemble a pattern in which the difference values alternate from a low value to a high value, to a low value, and so forth.

Referring back to FIG. 5, if, according to the YES branch of decisional block 510, the difference values alternate repetitively between a high value and a low value for the plurality of consecutive fields as illustrated in FIG. 7, then according to block 512 (FIG. 5) a conclusion can be made that the video stream originated from a progressive format. Again, a determination is made whether a value is larger than the previous value, and followed by a smaller value, then followed by a large value, and so forth. It is noted that the actual values may be ignored. That is, by simply comparing whether the pattern of high, low, high, low, high, value, and so forth, it is possible declare that the original video stream was formatted in the progressive scan format. However, if the pattern doesn't hold, a declaration is made that the video stream did not originate in the progressive scan format.

Alternatively, a threshold may be utilized when looking for the pattern, "high value, low value, high value, low value." The threshold may be a particular percentage, i.e., five percent. Accordingly, a determination is made that there is a high value when the value is determined to be at least a certain percentage, i.e., 5%, higher than the previous value. Correspondingly, a low value is declared, when the value is determined to be at least a certain percentage, i.e., 5%, lower than the previous value.

On the other hand, if according to the NO branch of decisional block 510, the difference values do not alternate repetitively between a high value and a low value for the plurality of consecutive fields as illustrated in FIG. 8, then according to block 514 (FIG. 5) a conclusion is made that the video stream did not originate from a progressive format. At the conclusion of blocks 512 and 514, process 500 may proceed to either to blocks 406 or 408 of FIG. 4 in accordance with method 400 described above.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system, comprising:
   an input buffer adapted to receive a video stream in an interlaced format; and
   a processor configured to determine whether or not at least a portion of the video stream in said input buffer was originally in a progressive format by:
   (a) identifying a line of pixels that is missing from a field of the video stream;
   (b) calculating a base value for a pixel on the missing line;
   (c) calculating a difference value between the base value on the missing line and an actual value for a correspondingly located pixel on the corresponding line from a previous field, the corresponding line being not missing in the previous frame;
   (d) repeating operations recited in paragraphs (a), (b) and (c) for a plurality of consecutive fields; and
   (e) concluding that the video stream originated from a progressive format when the difference values alternate repetitively between a high value and low value for the plurality of consecutive fields.

2. The system as recited in claim 1, wherein the processor is further configured to reconstruct the video stream in the progressive format from the interlaced format by combining fields of the video stream that correspond to a frame in the interlaced format to form the corresponding progressive format frame when it is determined that the video stream originated from the progressive format.

3. The system as recited in claim 1, further comprising an output buffer configured to transmit the video stream in a progressive format reconstructed from the interlaced format, when the video stream originated from the progressive format.

4. An apparatus for deinterlacing a video stream received in an interlaced format, comprising:
   a processing system configured to determine whether or not the video stream was originally in a progressive format by:
   (a) identifying a missing line in a field;
   (b) calculating an average value for a pixel on the missing line;
   (c) calculating a difference value between the average value on the missing line and an actual value for a corresponding pixel on a non-missing line from a previous field;
   (d) repeating operations recited in paragraphs (a), (b) and (c) for a plurality of consecutive fields; and
   (e) concluding that the video stream originated from a progressive format, when the difference values alternate repetitively between a high value and low value for the plurality of consecutive fields:
   wherein the processing system is configured to convert the video stream from the interlaced format to a progressive format by interpolating missing lines from fields of the video stream in the interlaced format, when the determination is that the video stream did not originate from the progressive format; and
   wherein the processing system is configured to reconstruct the video stream in the progressive format from the interlaced format, by combining fields that correspond to an interlaced frame of the video stream to form the corresponding progressive format frame when the determination is that the video stream originated from the progressive format.

5. A method, comprising:
   receiving the video stream in an interlaced format; and
   determining whether the video stream originated from a progressive by:
   (a) identifying a missing line in a field;
   (b) calculating an average value for a pixel on the missing line;
   (c) calculating a difference value between the average value on the missing line and an actual value for a corresponding pixel on a non-missing line from a previous field;
   (d) repeating operations recited in paragraphs (a), (b) and (c) for a plurality of consecutive fields;
   (e) analyzing whether the difference values alternate repetitively between a high value and low value for the plurality of consecutive fields; and
   (f) concluding that the video stream originated from a progressive format, if the difference values alternate repetitively between a high value and low value for the plurality of consecutive fields.

6. The method as recited in claim 5, further comprising:
constructing the original version of the video stream in the progressive format from the interlaced format, by combining consecutive pairs of corresponding fields of the video stream in the interlaced format to form frames of the video stream in the progressive format, if the video stream originated from the progressive format.

7. A method for deinterlacing a video stream, the method comprising:
receiving the video stream in an interlaced format;
determining whether the video stream originated from a progressive format by;
(a) identifying a missing line in a field;
(b) calculating an average value for a pixel on the missing line;
(c) calculating a difference value between the average value on the missing line and an actual value for a corresponding pixel on a non-missing line from a previous field;
(d) repeating operations recited in paragraphs (a), (b) and (c) for a plurality of consecutive fields;
(e) analyzing whether the difference values alternate repetitively between a high value and low value for the plurality of consecutive fields; and
(f) concluding that the video stream originated from a progressive format, if the difference values alternate repetitively between a high value and low value for the plurality of consecutive fields; and
reconstructing the video stream in the progressive format by combining consecutive pairs of corresponding fields from the video stream in the interlaced format to form frames of the video stream in the progressive format, if the video stream originated from the progressive format.

8. A method, comprising the steps of:
analyzing a video stream in an interlaced format to determine whether the video stream originated from a progressive format, the analyzing further comprising the steps of:
(a) identifying a line of pixels that are missing from a field of the video stream;
(b) calculating a base average value for a pixel on the missing line;
(c) calculating a difference value between the base value on the missing line and an actual value for a correspondingly located pixel on the corresponding line from a previous field, the corresponding line being not missing the previous frame;
(d) repeating operations recited in paragraphs (a), (b) and (c) for a plurality of consecutive fields;
(e) analyzing whether the difference values alternate repetitively between a high value and low value for the plurality of consecutive fields; and
(f) concluding that the video stream originated from a progressive format, if the difference values alternate repetitively between a high value and low value for the plurality of consecutive fields.

9. The method as recited in claim 8, further comprising:
reconstructing the video stream in the progressive format by combining consecutive pairs of corresponding fields from the video stream in the interlaced format to form frames of the video stream in the progressive format, if the video stream originated from the progressive format.

10. One or more processor-readable media having stored thereon processor executable instructions that, when executed by one or more processors, causes the one or more processors of a system to determine whether a video stream in an interlaced format originated from a progressive format by:
(a) identifying a missing line in a field of the video stream;
(b) calculating an average value for a pixel on the missing line;
(c) calculating a difference value between the average value on the missing line and an actual value for a corresponding pixel on a non-missing line from a previous field;
(d) repeating operations recited in paragraphs (a), (b) and (c) for a plurality of consecutive fields; and
(f) concluding that the video stream originated from a progressive format, when the difference values alternate repetitively between a high value and low value for the plurality of consecutive fields.

11. One or more processor-readable media as recited in claim 10, further comprising processor executable instructions that, when executed, direct the system to cause the video stream to revert back to the progressive format, if the video stream originated from the progressive format.

12. One or more processor-readable media having stored thereon processor executable instructions that, when executed by one or more processors, causes the one or more processors of a system to analyze a video stream in an interlaced format to determine whether the video stream originated from a progressive format, including:
(a) identifying a missing line in a field of the video stream;
(b) calculating an average value for a pixel on the missing line;
(c) calculating a difference value between the average value on the missing line and an actual value for a corresponding pixel on a non-missing line from a previous field;
(d) repeating operations recited in paragraphs (a), (b) and (c) for a plurality of consecutive fields;
(e) concluding that the video stream originated from a progressive format, if the difference values alternate repetitively between a high value and low value for the plurality of consecutive fields.

13. A system for analyzing a video stream in an interlaced format to determine whether the video stream originated from a progressive format, comprising:
means for identifying a missing line in a field of the video stream;
means for calculating an average value for a pixel on the missing line;
means for calculating a difference value between the average value on the missing line and an actual value for a corresponding pixel on a non-missing line from a previous field;
means for repeating operations performed by the means for identifying, the
means for calculating the average value, and the means for calculating the difference value, for a plurality of consecutive fields; and
means for concluding that the video stream originated from a progressive format, when the difference values alternate repetitively between a high value and low value for the plurality of consecutive fields.

* * * * *